US012601878B2

(12) United States Patent
Wang et al.

(10) Patent No.: US 12,601,878 B2
(45) Date of Patent: Apr. 14, 2026

(54) PRE-CONNECTOR AND CONNECTOR

(71) Applicants: Fujin Precision Industrial (Jincheng)Co., Ltd., Jincheng (CN); HON HAI PRECISION INDUSTRY CO., LTD., New Taipei (TW)

(72) Inventors: Ya-Peng Wang, Jincheng (CN); Xian-Ni Luo, Jincheng (CN); Chong-Cong Li, Jincheng (CN); Hai-Tao Jing, Jincheng (CN)

(73) Assignees: Fujin Precision Industrial (Jincheng)Co., Ltd., Jincheng (CN); HON HAI PRECISION INDUSTRY CO., LTD., New Taipei (TW)

( * ) Notice: Subject to any disclaimer, the term of this patent is extended or adjusted under 35 U.S.C. 154(b) by 333 days.

(21) Appl. No.: 18/211,343

(22) Filed: Jun. 19, 2023

(65) Prior Publication Data

US 2024/0201451 A1    Jun. 20, 2024

(30) Foreign Application Priority Data

Dec. 16, 2022    (CN) .......................... 202211626279.5

(51) Int. Cl.
*G02B 6/38* (2006.01)

(52) U.S. Cl.
CPC ......... *G02B 6/3879* (2013.01); *G02B 6/3825* (2013.01); *G02B 6/3839* (2013.01); *G02B 6/3858* (2013.01); *G02B 6/3893* (2013.01)

(58) Field of Classification Search
CPC .. G02B 6/3879; G02B 6/3825; G02B 6/3839; G02B 6/3858; G02B 6/3893; G02B 6/38; G02B 6/36
See application file for complete search history.

(56) References Cited

U.S. PATENT DOCUMENTS

| | | | | |
|---|---|---|---|---|
| 5,048,920 | A * | 9/1991 | Newell ................... | G02B 6/381 |
| | | | | 385/55 |
| 5,742,719 | A * | 4/1998 | Birnbaum ............ | G02B 6/3888 |
| | | | | 385/76 |
| 10,107,968 | B2 * | 10/2018 | Tong ...................... | G02B 6/389 |
| 2004/0081419 | A1 * | 4/2004 | Takeda ................. | G02B 6/3849 |
| | | | | 385/134 |
| 2014/0233894 | A1 * | 8/2014 | Schunk ................... | G02B 6/36 |
| | | | | 385/77 |
| 2015/0093077 | A1 * | 4/2015 | Huang ................. | G02B 6/3807 |
| | | | | 385/76 |
| 2017/0139155 | A1 * | 5/2017 | Tong .................... | G02B 6/3882 |
| 2018/0128991 | A1 * | 5/2018 | Vallance ............. | G02B 6/3862 |
| 2018/0252875 | A1 * | 9/2018 | Pimpinella ........... | G02B 6/3857 |
| 2022/0413227 | A1 * | 12/2022 | Huang ................. | G02B 6/3825 |
| 2023/0393345 | A1 * | 12/2023 | Erdman .............. | G02B 6/3885 |
| 2024/0045152 | A1 * | 2/2024 | Tanaka ................. | G02B 6/3861 |

* cited by examiner

*Primary Examiner* — Thomas A Hollweg
*Assistant Examiner* — Marc E Manheim
(74) *Attorney, Agent, or Firm* — ScienBiziP, P.C.

(57) ABSTRACT

A pre-connector is configured to detachably fix to an optical fiber group. The pre-connector includes a shell assembly and a limiting member. The shell assembly is configured to accommodate one end of the optical fiber group. The limiting member is clamped in the shell assembly and is configured to press against the optical fiber group to fix the optical fiber group to the shell assembly. The present disclosure further provides a connector including the pre-connector.

9 Claims, 10 Drawing Sheets

PRE-CONNECTOR AND CONNECTOR

FIELD

The subject matter herein generally relates to fixing of optical fibers, and more particularly, to a pre-connector and a connector.

BACKGROUND

Polarization-maintaining fiber patch cords are aligned with an adapter through a connector, to ensure a direction of an axis of the patch cords, thereby allowing the patch cords to have a high extinction ratio and a low insertion loss. The patch cords are fixed to the connector by an adhesive. In the process of assembling the patch cords, the adhesive is first applied on the patch cords, and the patch cords are rotated to adjust an angle of the patch cords before the adhesive cured. When the adhesive is not fully cured, stresses generated between the adhesive and the optical fibers will cause an angle of slow axis to shift. The shift angle may reduce the quality of the product. In addition, both the curing process and the angle adjustment process need to be carried out on a piece of equipment, which is costly. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
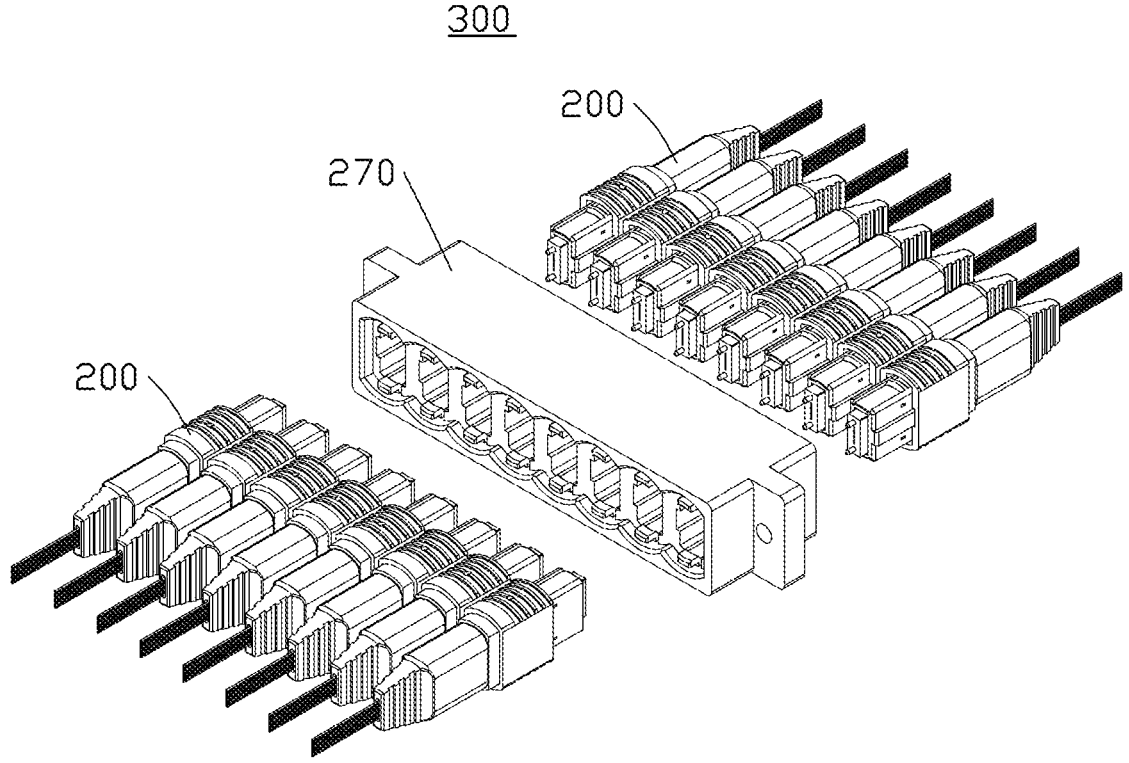
FIG. 1 is an exploded view of an embodiment of a polarization-maintaining fiber assembly according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Referring to FIG. 1, a polarization-maintaining fiber assembly 300 is provided according to an embodiment of the present disclosure. The assembly 300 includes a connector 200 and an adapter 270. The connector 200 may include a male connector or a female connector connected to each other. A connecting portion of the male connector and the female connector may be received in the adapter 270.

Figure 2:
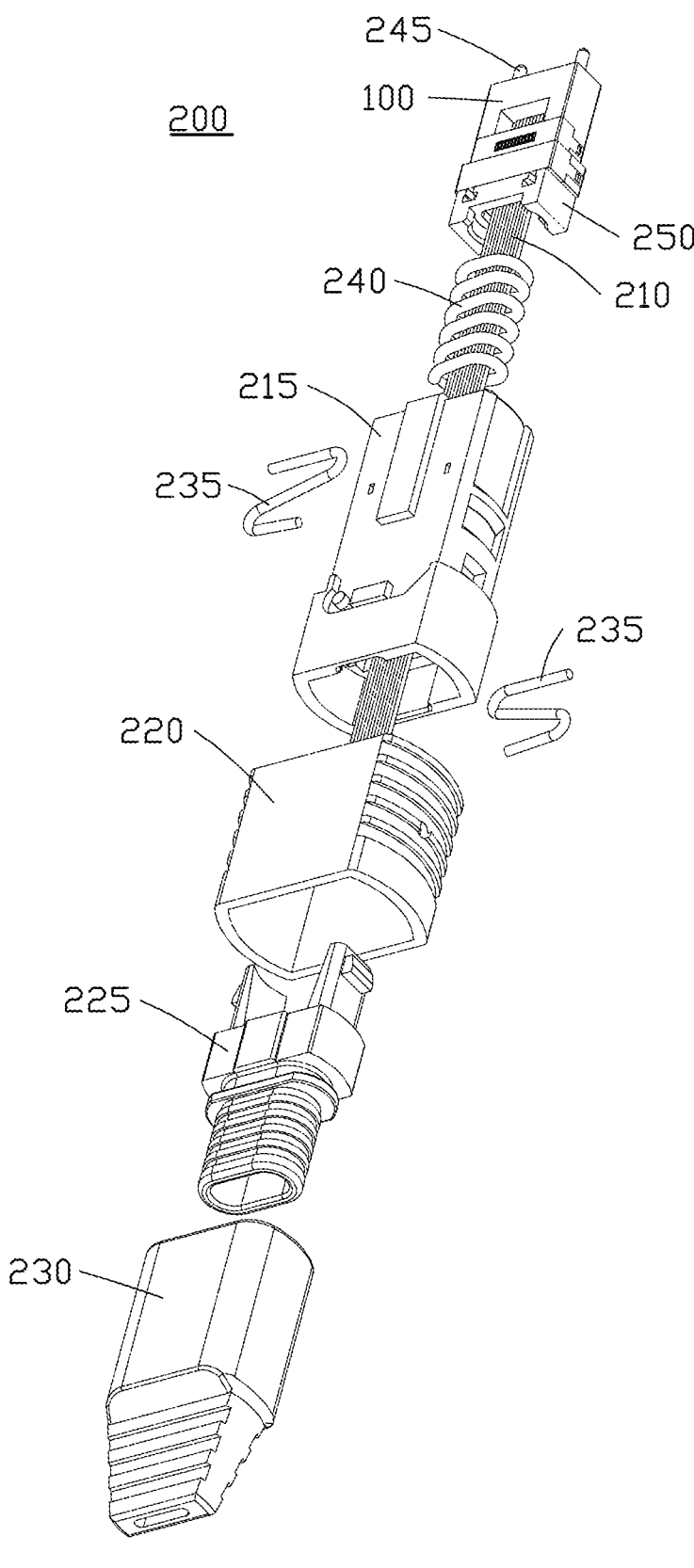
FIG. 2 is an exploded view of a connector of the polarization-maintaining fiber assembly of FIG. 1.
Figure 4:
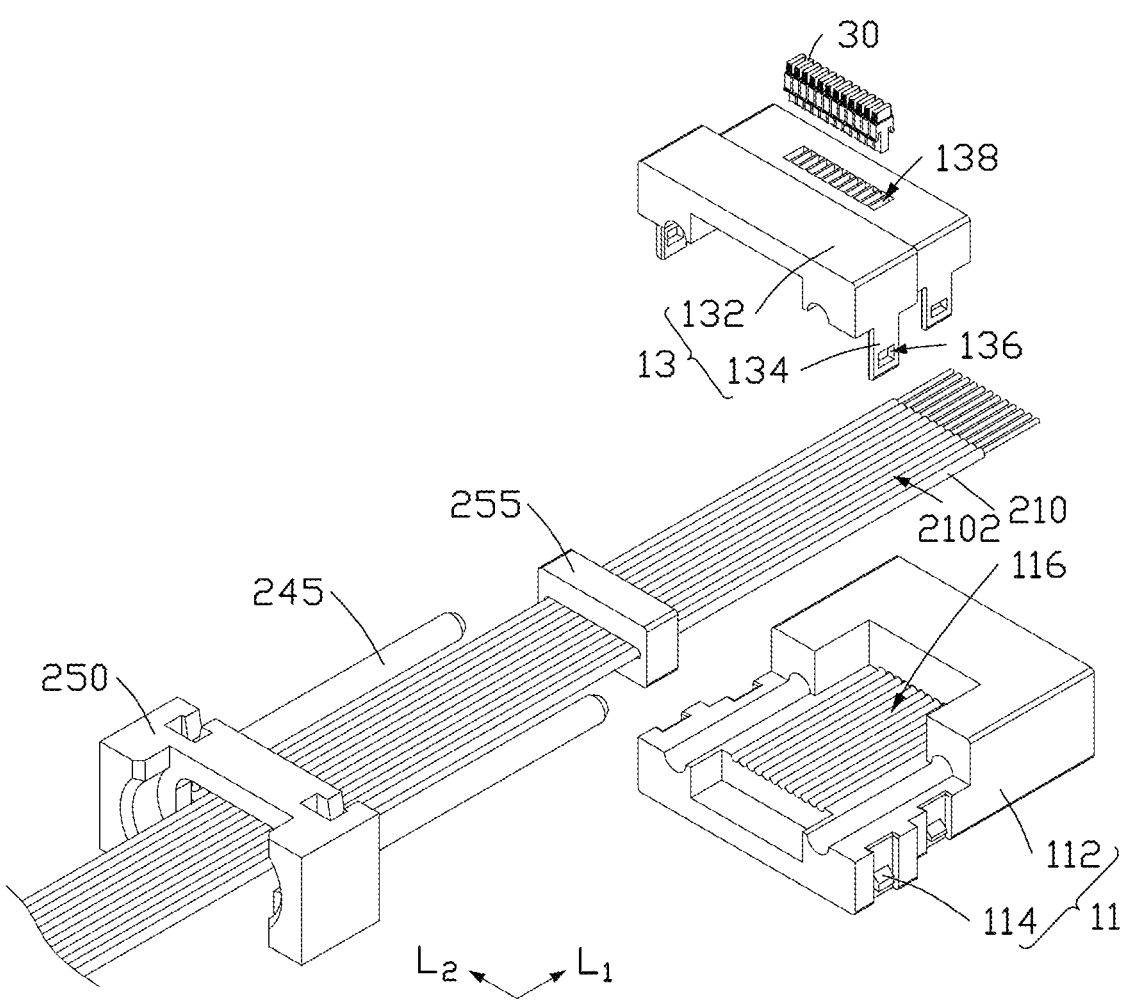
FIG. 4 is an exploded view of the pre-connector and the optical fibers of FIG. 3.

Referring to FIG. 2, each of the male connector and the female connector may include a pre-connector 100, an optical fiber group 210, an inner housing 215, an outer housing 220, a back housing 225, a first sleeve 230, a Z-shaped spring 235, at least one circular spring 240, a clip 250, and a second sleeve 255 (shown in FIG. 4). The optical fiber group 210 includes a plurality of optical fibers. The optical fiber group 210 are detachably fixed to the pre-connector 100. The fixing manner of the pre-connector 100 and the optical fiber group 210 in the male connector may be the same as that in the female connector. In at least one embodiment, the connector 200 shown in FIG. 1 is a male connector, which further includes a plug 245. The female connector further includes a slot engaged with the plug 245.

During assembling the connector 200, the outer housing 220 is sleeved on the inner housing 215. The Z-shaped spring 235 is disposed between the outer housing 220 and the inner housing 215. The optical fiber group 210 is fixed on the pre-connector 100, and the second sleeve 255 connects the optical fiber group 210 together. The circular spring 240 is sleeved on the optical fiber group 210. The plug 245 is fixed on the clip 250 and passes through the pre-connector 100. The inner housing 215 is sleeved on the circular spring 240, and the back housing 225 is clamped on the pre-connector 100. The circular spring 240 is disposed between the back housing 225 and the pre-connector 100. The first sleeve 230 is sleeved on the outer surface of the optical fiber group 210 and the back housing 225 for protection purpose.

Figure 3:
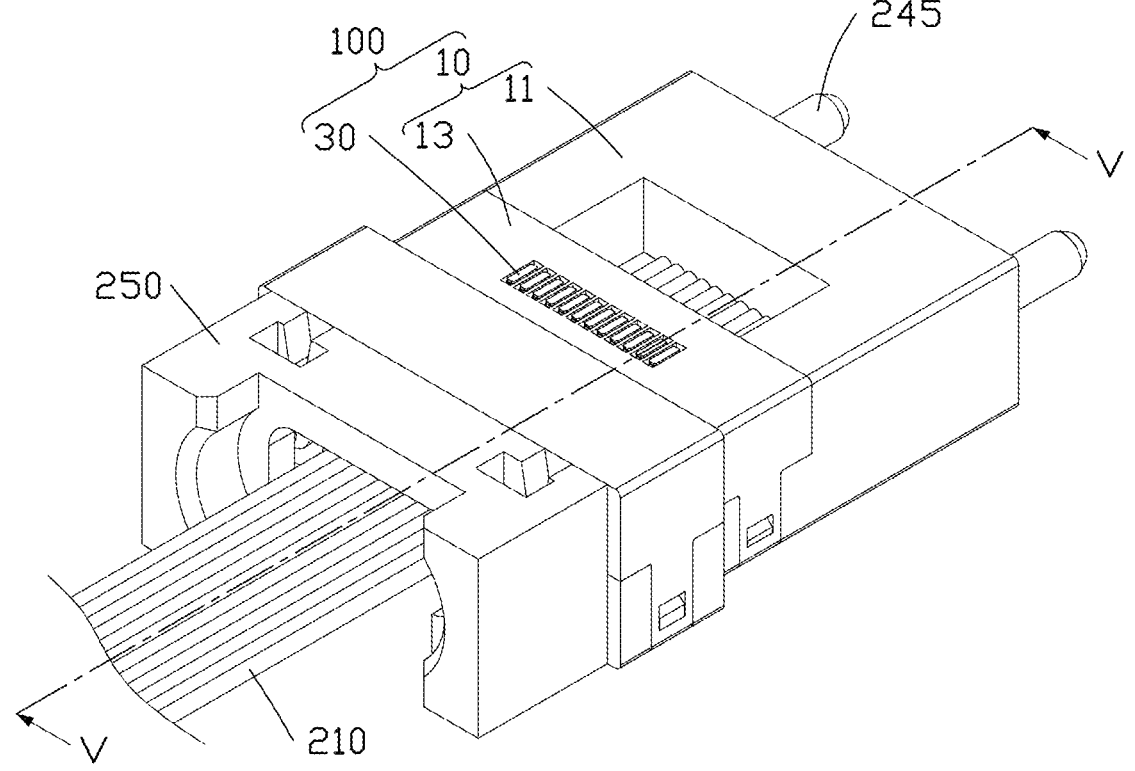
FIG. 3 is a diagrammatic view of an embodiment of a pre-connector of the connector of FIG. 1, wherein optical fibers are fixed to the pre-connector.

Referring to FIG. 3, the pre-connector 100 includes a shell assembly 10 and a plurality of limiting members 30. One end of the optical fiber group 210 is accommodated in the shell assembly 10. The limiting members 30 are detachably connected to the shell assembly 10 and press against a surface 2102 (shown in FIG. 4) of the optical fiber group 210, so that the optical fiber group 210 is detachably fixed to the shell assembly 10.

Figure 5:
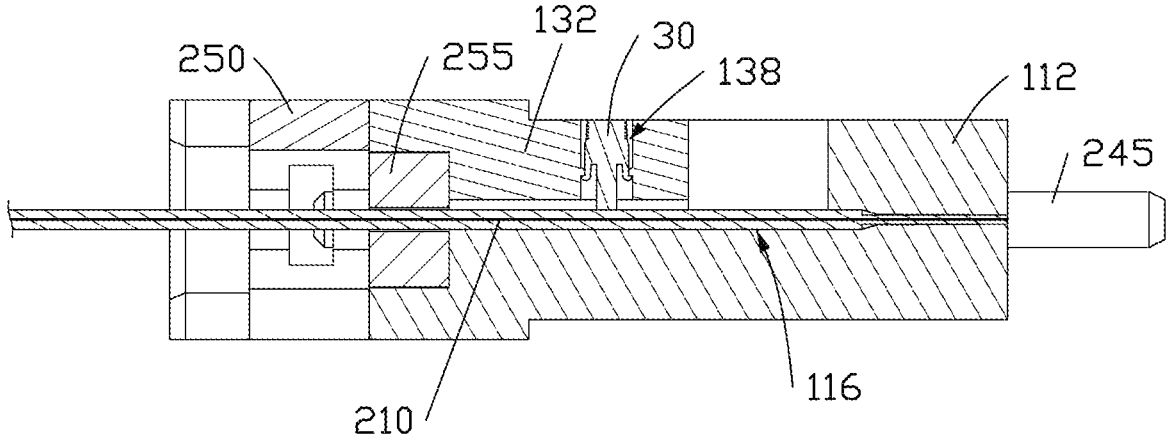
FIG. 5 is a cross-sectional view of the pre-connector and the optical fibers, taken along line V-V, of FIG. 3.

Referring to FIGS. 4 and 5, in the embodiment, the shell assembly 10 includes a first shell 11 and a second shell 13 detachably connected to each other. The first shell 11 includes a first body portion 112 and two first engaging portions 114. The first body portion 112 is substantially L-shaped, and the two first engaging portions 114 are disposed on two sides of the first body portion 112. The second shell 13 includes a second body portion 132 and two extending portions 134. The two extending portions 134 are extended from a surface of the second body portion 132. A clamping groove 136 is defined on each extending portion 134. Each first engaging portion 114 can be clamped in the corresponding clamping groove 136, so that the first shell 11 is detachably connected to the second shell 13.

In other embodiments, the positions of the first engaging portions and the extending portion can be interchanged. That is, the first engaging portions are disposed on the second body portion, and the extending portion is disposed on the first body portion, so that the first shell and the second shell are detachably connected to each other. In other embodiments, the first shell and the second shell may be integrally formed.

A plurality of grooves 116 are defined on the first body portion 112. Each groove 116 extends along a first direction L1, and the grooves 116 are spaced from each other in a second direction L2 perpendicular to the first direction L1. The optical fiber group 210 extends along the first direction L1, and an end of each optical fiber is accommodated in the corresponding groove 116.

A plurality of first through holes 138 are defined on the second body portion 132. The first through holes 138 are spaced from each other, and each first through hole 138 communicates with a corresponding one of the grooves 116. When the optical fiber group 210 is accommodated in the grooves 116, the surface 2102 of the optical fiber group 210 is partially exposed from the first through holes 138.

Each limiting member 30 is accommodated in the corresponding first through hole 138, and each limiting member 30 is used to limit the position of the corresponding optical fiber. Each first through hole 138 is substantially rectangular in cross section. A long side of each first through hole 138 extends along the first direction L1, and a short side of each first through hole 138 extends along the second direction L2. That is, the long side extends along the extending direction of the optical fiber group 210, so that a contact area between each limiting member 30 and the corresponding optical fiber can be increased, so that the stability of the optical fiber group 210 can be increased.

Figure 6:
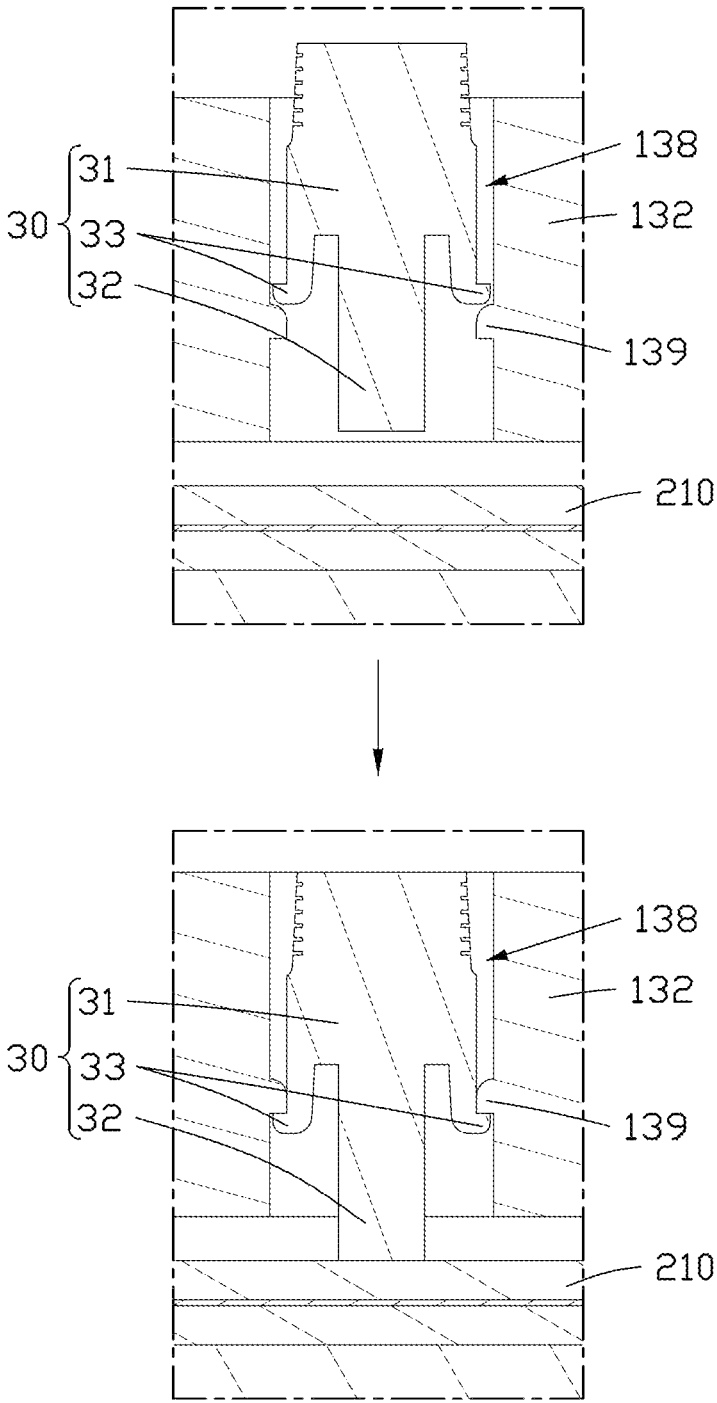
FIG. 6 is a diagrammatic view showing an assembling process of a limiting member and the optical fibers of FIG. 4.

Referring to FIG. 6, the second body portion 132 includes a plurality of protrusions 139, and each protrusion 139 extends toward an axis of the corresponding first through hole 138. In the embodiment, two protrusions 139 are disposed in each first through hole 138.

Each limiting member 30 includes a first connecting portion 31, a first pressing portion 32, and two first clamping portions 33. The first pressing portion 32 extends from one side of the first connecting portion 31. The two first clamping portions 33 are disposed on two sides of the first connecting portion 31. The two first clamping portions 33 are disposed on two sides of the first connecting portion 31 along the first direction L1. The first pressing portion 32 is disposed between the two first clamping portions 33 and spaced apart from the first clamping portions 33, so that the first clamping portions 33 can be deformed relative to the first pressing portion 32. Each of the first clamping portions 33 is hook-shaped, which extends away from the first pressing portion 32, so that the protrusions 139 are engaged with the first clamping portions 33.

When assembling the limiting members 30, the optical fiber group 210 are placed in the grooves 116. Then, the limiting members 30 are placed in the first through holes 138, and the first pressing portion 32 first enters the first through holes 138 and moves toward the optical fiber group 210. When the first clamping portions 33 are in contact with the protrusions 139, the limiting members 30 are further pressed down, and the two first clamping portions 33 are deformed toward the first pressing portion 32 until the first locking portion 33 slides from one side of the protrusions 139 to the other side of the protrusions 139. At this time, the protrusions 139 is engaged with the first clamping portions 33. The first pressing portion 32 is in contact with the surface 2102 of the optical fiber group 210 exposed from the first through holes 138, thereby fixing the optical fiber group 210 in the shell assembly 10.

In some embodiment, a surface of the first pressing portion 32 in contact with the optical fiber group 210 is arc-shaped, so that the first pressing portion 32 matches each optical fiber in shape to increase the contact area between the first pressing portion 32 and each optical fiber.

In some embodiments, the first through holes 138 may communicate with each other as one through hole, and the limiting members 30 may also be connected to each other as a whole.

A space for accommodating the plug 245 is also formed between the first shell 11 and the second shell 13. One end of the plug 245 is fixed on the second sleeve 255. The other end of the plug 245 passes between the first shell 11 and the second shell 13 and protrudes from the first shell 11. The end of the plug 245 protruding from the first shell 11 can connect with the female connector.

Figure 7:
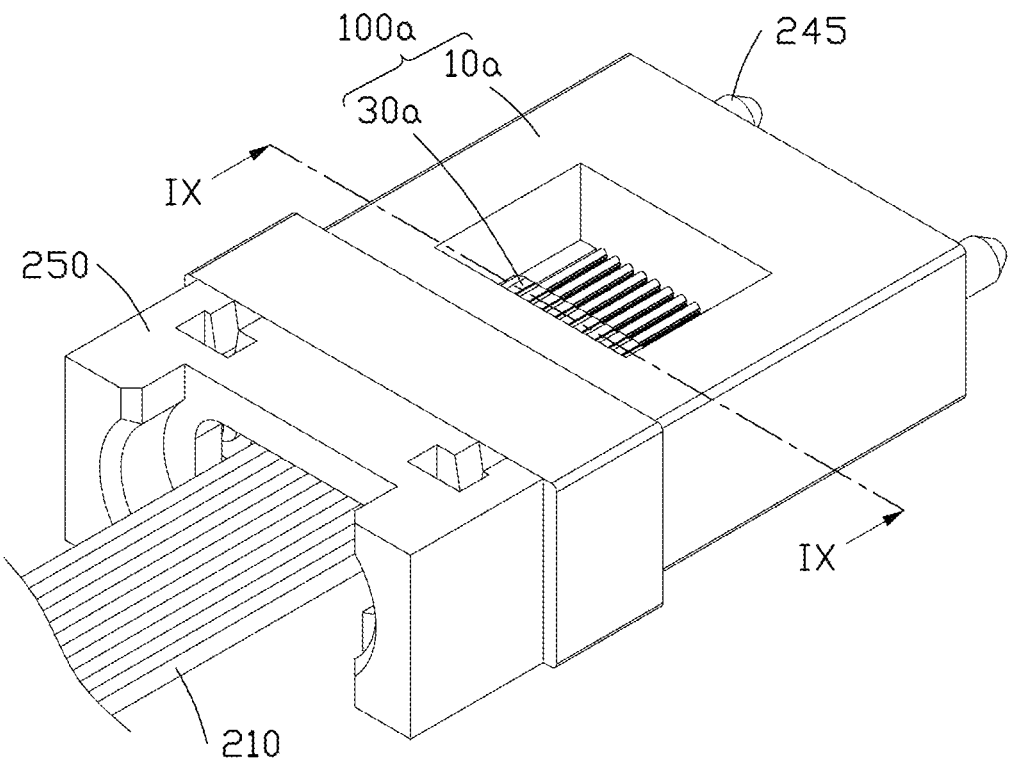
FIG. 7 is a diagrammatic view of another embodiment of a pre-connector of the connector of FIG. 1, wherein optical fibers are fixed to the pre-connector.

Referring to FIG. 7, a pre-connector 100a is provided according to another embodiment of the present disclosure. The pre-connector 100a includes a shell assembly 10a and a limiting member 30a.

Figure 8:
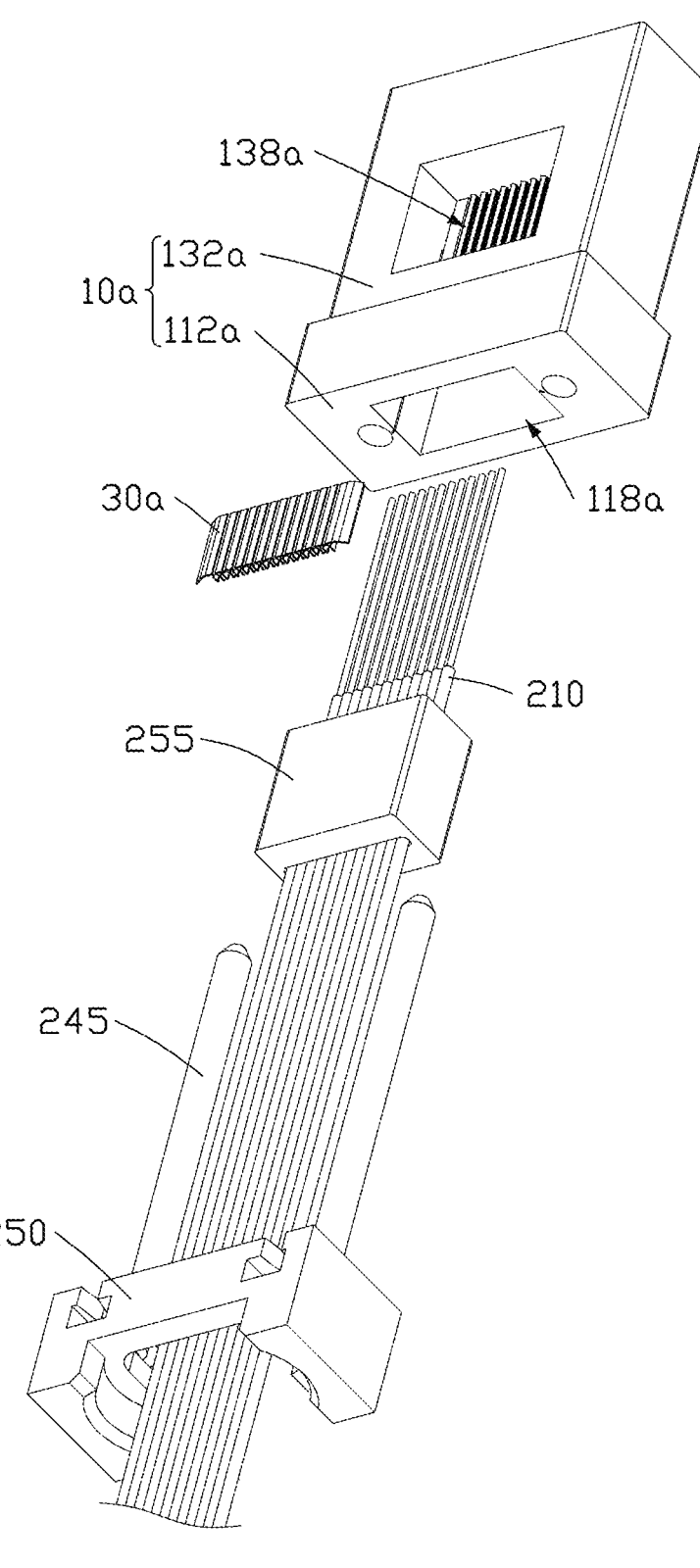
FIG. 8 is an exploded view of the pre-connector and the optical fibers of FIG. 7.

Referring to FIG. 8, the shell assembly 10a includes a first body portion 112a, a second body portion 132a, and a plurality of supporting portions 15a. The first body portion 112a, the second body portion 132a, and the supporting portions 15a are integrally formed. The first body portion 112a is fixedly to the second body portion 132a, and the supporting portions 15a are spaced from each other on the first body portion 112a. An accommodating groove 118a is defined on the first body portion 112a, and a second through hole 138a is defined on the second body portion 132a. The accommodating groove 18a communicates with the second through hole 138a. The supporting portions 15a are accommodated in the accommodating groove 118a and exposed from the second through hole 138a. One end of the optical fiber group 210 can be placed on the corresponding supporting portions 15a. Each supporting portion 15a can support one optical fiber. A portion of the surface 2102 of the optical fiber group 210 is exposed from the second through hole 138a.

Figure 9:
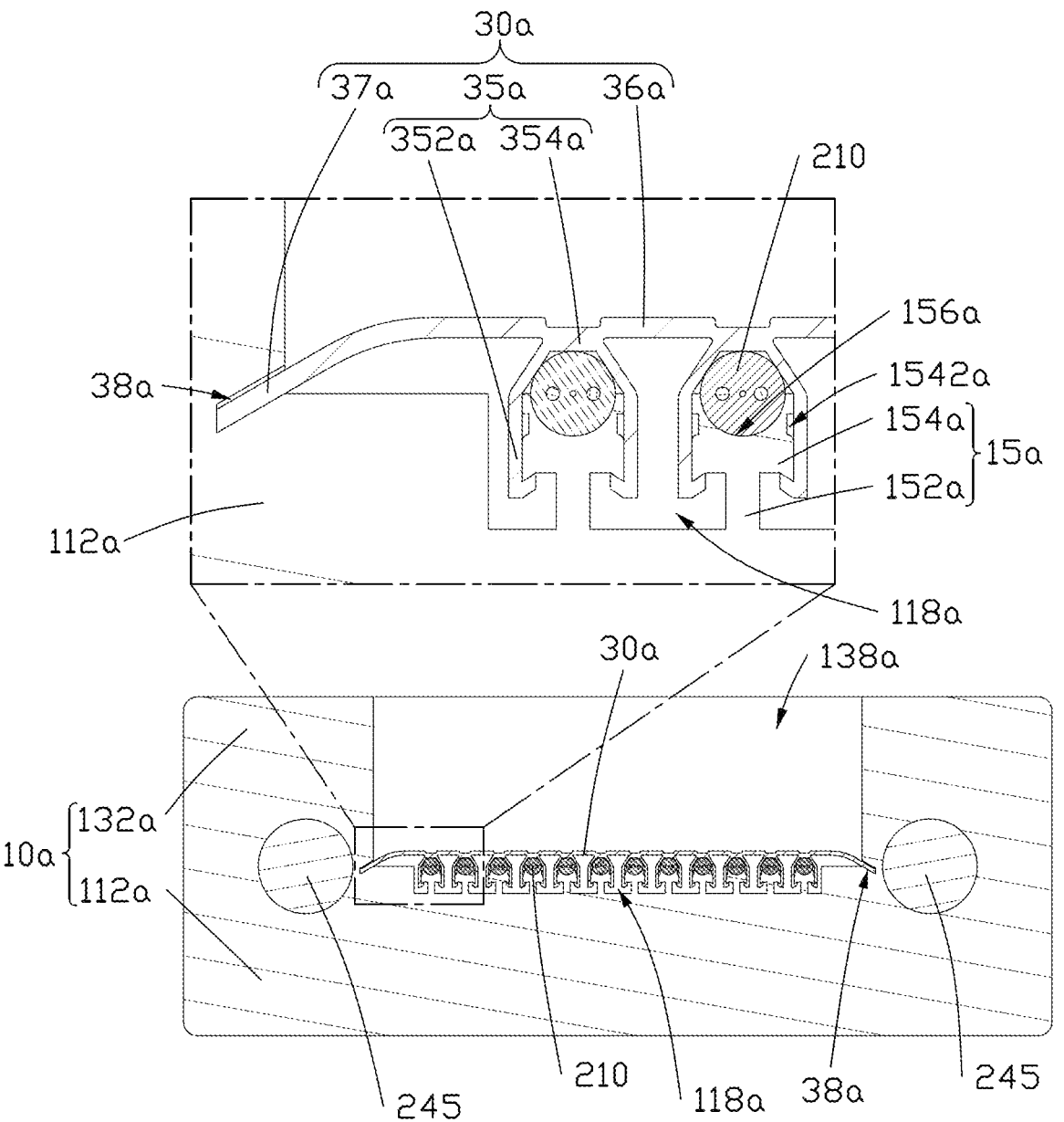
FIG. 9 is a cross-sectional view the pre-connector and the optical fibers, taken along line IX-IX, of FIG. 7.

Referring to FIG. 9, each supporting portion 15a includes a carrying portion 152a and two limiting portions 154a. The carrying portion 152a is fixed on a surface of the first body portion 112a and extends away from the first body portion 112a. The two limiting portions 154a are disposed on two sides of the carrying portion 152a and protrude from the carrying portion 152a. The two limiting portions 154a are spaced apart from the carrying portion 152a. Each limiting portion 154a is hook-shaped. The carrying portion 152a and the surfaces of the two limiting portions 154a facing away from the first body portion 112a cooperatively form a supporting surface 156a, and the supporting surface 156a is arc-shaped and engaged with the optical fiber group 210.

Two clamping slots 38a are defined between the first body portion 112a and the second body portion 132a. The clamping slots 38a communicates with the second through hole 138a, and the clamping slots 38a can clamp with the limiting member 30a.

The limiting member 30a includes a plurality of limiting units 35a, a plurality of bendable portions 36a, and two second engaging portions 37a. The two second engaging portions 37a are disposed at two ends of the limiting member 30a and are connected to the limiting units 35a, and each second engaging portion 37a is engaged in the corresponding clamping slots 38a. The limiting units 35a are spaced from each other, and two adjacent limiting units 35a are connected by the bendable portion 36a. Each limiting unit 35a can fix to one optical fiber 210.

Each limiting unit 35a includes two second clamping portions 352a and a second pressing portion 354a. The two second clamping portions 352a are connected to the second pressing portion 354a, and are disposed on two sides of the second pressing portion 354a. The bendable portion 36a connects two adjacent second pressing portions 354a. When the optical fiber group 210 is not fixed by the limiting member 30a, the bendable portion 36a is bent relative to the two adjacent limiting units 35a. That is, the bendable portion 36a has a certain radian and is bent toward the side away from the limiting units 35a. A section of the limiting units 35a formed by the second pressing portion 354a and the second clamping portions 352a is substantially C-shaped. An end of the second clamping portions 352a away from the second pressing portion 354a is hook-shaped, and the hook-shaped structure extends toward the inside of the limiting units 35a. The hook-shaped second clamping portions 352a can be clamped on the limiting portions 154a to confine the optical fiber group 210.

Two positioning grooves 1542a are defined on each limiting portions 154a. The two positioning grooves 1542a are formed by a depression on a surface of the limiting portions 154a. The positioning groove 1542a can position the limiting member 30a during the process of assembling the limiting member 30a. The second clamping portions 352a are pre-positioned in the positioning groove 1542a so as to adjust the position of the limiting member 30a and a rotation angle of the optical fiber group 210.

Figure 10:
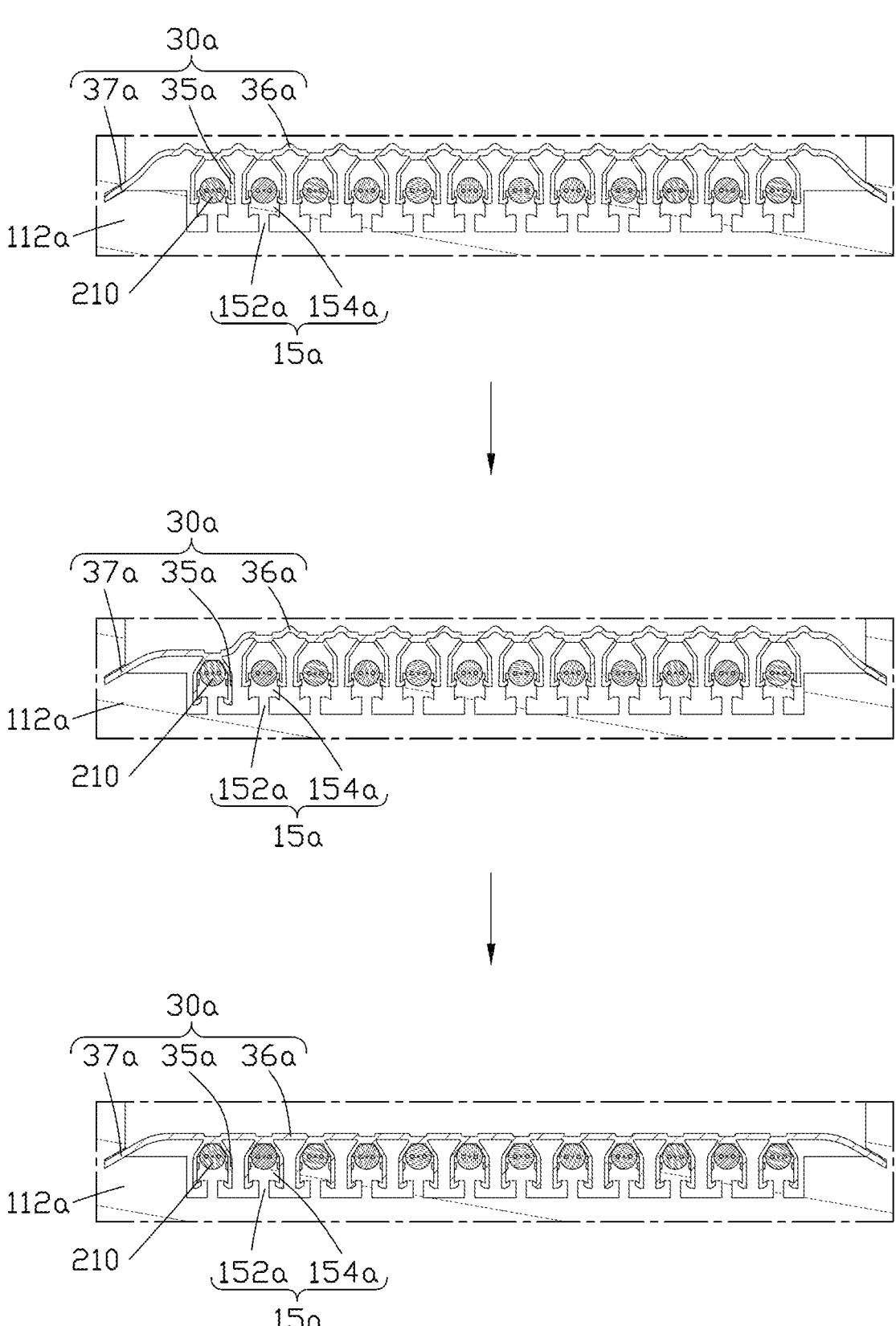
FIG. 10 is a diagrammatic view showing an assembling process of a limiting member and the optical fibers of FIG. 7.

Referring to FIG. 10, when assembling the limiting member 30a, the optical fiber group 210 is placed on the supporting surface 156a. The two second engaging portions 37a of the limiting member 30a are clamped in the corresponding clamping slots 38a, and the second clamping portions 352a are positioned in the positioning groove 1542a. Then, the second pressing portions 354a are pressed sequentially toward the optical fiber group 210, and the second clamping portions 352a are in contact with the limiting portions 154a until the second clamping portions 352a and the limiting portions 154a are clamped with each other. At this time, the second pressing portion 354a is in contact with the optical fiber group 210. During the process of assembling the limiting member 30a, the bendable portions 36a can be deformed, so that the limiting units 35a can fix to the optical fiber group 210. The bendable portions 36a of the limiting member 30a after assembly is flat. That is, each bendable portion 36a is flat, and the bendable portions 36a are on the same plane. The bendable portions 36a abut against the limiting units 35a, so that the second clamping portions 352a are firmly clamped on the supporting portions 15a.

The pre-connector 100 (100a) provided in the embodiment of the present disclosure can clamp the limiting member 30 (30a) with the shell assembly 10 (10a) during the assembly process. The optical fiber group 210 can be fixed in the shell assembly 10 (10a) without the need of adhesive. The assembly efficiency is high. Furthermore, since no adhesive is needed to fix the optical fiber group 210 to the shell assembly 10 (10a), so the time for waiting the adhesive to solidify is save, and the deviation of the optical fiber group 210 during the solidifying process is avoided. The assembly process does not require any assembling equipment, and the cost of the assembly is low.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A pre-connector configured to detachably fix to an optical fiber group, the pre-connector comprising:
   a shell assembly configured to accommodate one end of the optical fiber group; and
   a limiting member clamped in the shell assembly and configured to press against the optical fiber group to fix the optical fiber group to the shell assembly;
   wherein the shell assembly comprises a plurality of supporting portions configured to support the optical fiber group; the limiting member comprises two second clamping portions and a second pressing portion, the two second clamping portions are disposed on two sides of the second pressing portion; the second pressing portion is configured to press against a surface of the optical fiber group, and the two second clamping portions are clamped on the plurality of supporting portions; the shell assembly further comprises a first body portion, the plurality of supporting portions are spaced from each other on the first body portion; each of the plurality of supporting portion comprises a carrying portion and two limiting portions, the carrying portion is fixed on the first body portion and extends toward a side away from the first body portion; the two limiting portions are disposed on two sides of the carrying portion and protrude relative to the carrying portion, the two limiting portions are spaced apart from the carrying portion; the two second clamping portions are configured to clamp on the two limiting portions.

2. The pre-connector of claim 1, wherein the shell assembly further comprises a second body portion fixed to the first body portion, and a second through hole is defined on the second body portion, two clamping slots are defined between the first body portion and the second body portion, and the two clamping slots communicate with the second through hole; two ends of the limiting member are clamped in the two clamping slots.

3. The pre-connector of claim 2, wherein the limiting member comprises a plurality of limiting units, a plurality of bendable portions, and two second engaging portions, the two second engaging portions are disposed at two ends of the limiting member and are connected to the limiting units; each of the two second engaging portions is engaged in one of the two clamping slots; the plurality of limiting units are spaced from each other, and two adjacent of the plurality of limiting units are connected to each other by one of the plurality of bendable portions.

4. The pre-connector of claim 1, wherein two positioning grooves are defined on the two limiting portions; the two second clamping portions are configured to be positioned in the two positioning grooves before the limiting member fixes the optical fiber group to the shell assembly.

5. The pre-connector of claim 2, wherein two positioning grooves are defined on the two respective limiting portions; the two second clamping portions are configured to be positioned in the respective two positioning grooves before the limiting member fixes the optical fiber group to the shell assembly.

6. The pre-connector of claim 3, wherein two positioning grooves are defined on the two limiting portions; the two second clamping portions are configured to be positioned in the two positioning grooves before the limiting member fixes the optical fiber group to the shell assembly.

7. A connector comprises a pre-connector configured to detachably fix to an optical fiber group, the pre-connector comprising:

a shell assembly configured to accommodate one end of the optical fiber group; and a limiting member clamped in the shell assembly and configured to press against the optical fiber group to fix the optical fiber group to the shell assembly;

wherein the shell assembly comprises a plurality of supporting portions configured to support the optical fiber group; the limiting member comprises two second clamping portions and a second pressing portion, the two second clamping portions are disposed on two sides of the second pressing portion; the second pressing portion is configured to press against a surface of the optical fiber group, and the two second clamping portions are clamped on the plurality of supporting portions; the shell assembly further comprises a first body portion, the plurality of supporting portions are spaced from each other on the first body portion; each of the plurality of supporting portion comprises a carrying portion and two limiting portions, the carrying portion is fixed on the first body portion and extends toward a side away from the first body portion; the two limiting portions are disposed on two sides of the carrying portion and protrude relative to the carrying portion, the two limiting portions are spaced apart from the carrying portion; the two second clamping portions are configured to clamp on the two limiting portions.

8. The connector of claim 7, wherein the shell assembly further comprises a second body portion fixed to the first body portion, and a second through hole is defined on the second body portion, two clamping slots are defined between the first body portion and the second body portion, and the two clamping slots communicate with the second through hole; two ends of the limiting member are clamped in the two clamping slots.

9. The connector of claim 8, wherein the limiting member comprises a plurality of limiting units, a plurality of bendable portions, and two second engaging portions, the two second engaging portions are disposed at two ends of the limiting member and are connected to the limiting units; each of the two second engaging portions is engaged in one of the two clamping slots; the plurality of limiting units are spaced from each other, and two adjacent of the plurality of limiting units are connected to each other by one of the plurality of bendable portions.

* * * * *